United States Patent
Gupta et al.

(10) Patent No.: US 7,222,200 B2
(45) Date of Patent: May 22, 2007

(54) METHOD FOR SYNCHRONIZING PROCESSORS IN SMI FOLLOWING A MEMORY HOT PLUG EVENT

(75) Inventors: Saurabh Gupta, Austin, TX (US); Paul D. Stultz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 10/964,877

(22) Filed: Oct. 14, 2004

(65) Prior Publication Data

US 2006/0085580 A1   Apr. 20, 2006

(51) Int. Cl.
*G06F 13/00* (2006.01)

(52) U.S. Cl. ................. 710/104; 710/266; 710/302

(58) Field of Classification Search ................ 710/301, 710/302, 104, 10, 13, 47, 48, 260–262, 264, 710/266–268
See application file for complete search history.

(56) References Cited

U.S. PATENT DOCUMENTS

| | | | |
|---|---|---|---|
| 5,530,891 A * | 6/1996 | Gephardt ..................... 710/8 |
| 6,065,053 A | 5/2000 | Nouri et al. |
| 6,073,255 A | 6/2000 | Nouri et al. |
| 6,088,816 A | 7/2000 | Nouri et al. |
| 6,092,143 A * | 7/2000 | Williams et al. ............ 710/266 |
| 6,108,781 A * | 8/2000 | Jayakumar ..................... 713/2 |
| 6,115,393 A | 9/2000 | Engel et al. |
| 6,122,746 A | 9/2000 | Nouri et al. |
| 6,138,250 A | 10/2000 | Nouri et al. |
| 6,145,098 A | 11/2000 | Nouri et al. |
| 6,163,849 A | 12/2000 | Nouri et al. |
| 6,199,173 B1 | 3/2001 | Johnson et al. |
| 6,249,885 B1 | 6/2001 | Johnson et al. |
| 6,266,721 B1 | 7/2001 | Sheikh et al. |
| 6,330,690 B1 | 12/2001 | Nouri et al. |
| 6,574,636 B1 | 6/2003 | Balon et al. |
| 6,611,911 B1 * | 8/2003 | O'Shea et al. ................. 713/1 |
| 6,684,292 B2 * | 1/2004 | Piccirillo et al. ........... 711/106 |
| 6,697,963 B1 | 2/2004 | Nouri et al. |
| 6,711,642 B2 * | 3/2004 | Huang ........................ 710/260 |
| 6,874,049 B1 * | 3/2005 | Huang ........................ 710/260 |
| 6,996,648 B2 * | 2/2006 | Vu ............................. 710/302 |
| 2003/0208654 A1 * | 11/2003 | Krontz et al. ............... 710/312 |

(Continued)

OTHER PUBLICATIONS

Intel Model-Specific Registers (MSRs).*

(Continued)

*Primary Examiner*—Khanh Dang
(74) *Attorney, Agent, or Firm*—Baker Botts L.L.P.

(57) ABSTRACT

A method for synchronizing processors during a system management interrupt caused from a memory hot plug event in multiple processor systems is disclosed. In one embodiment, a method for synchronizing processors during an assertion of a system management interrupt (SMI) in an information handling system including, for each processor, identifying whether the processor is an interrupt handling processor assigned to perform processing tasks necessary for resolving the SMI or a non-interrupt handling processor not assigned to perform the processing tasks necessary for resolving the SMI. The method further includes creating a task structure operable to cause non-interrupt handling processors to perform at least one task for each interrupt handling processor. The method further includes automatically performing the at least one task during the SMI for each non-interrupt handling processor.

18 Claims, 4 Drawing Sheets

U.S. PATENT DOCUMENTS

2004/0186988 A1* 9/2004 Polyudov .................... 713/100

OTHER PUBLICATIONS

AMD Duron Processor Model 8 Dat Sheet, Aug. 2003.*
Definition of System Management Model from Wikipedia.*
Definition of Memory Type Range Registers from InstantWeb.*
Definition of Intel APIC Architecture by Wikipedia.*

* cited by examiner

FIG. 1

| PRESENCE BYTE [BYTE 1] | STATUS BYTE [BYTE 2] |
|---|---|
| PROCESSOR ID NUMBER [ID 0] | TASK ID NUMBER [ID 0] |
| PROCESSOR ID NUMBER [ID 1] | TASK ID NUMBER [ID 1] |
| PROCESSOR ID NUMBER [ID 2] | TASK ID NUMBER [ID 2] |
| PROCESSOR ID NUMBER [ID 3] | TASK ID NUMBER [ID 3] |
| PROCESSOR ID NUMBER [ID 4] | TASK ID NUMBER [ID 4] |
| PROCESSOR ID NUMBER [ID 5] | TASK ID NUMBER [ID 5] |
| PROCESSOR ID NUMBER [ID 6] | TASK ID NUMBER [ID 6] |
| PROCESSOR ID NUMBER [ID 7] | TASK ID NUMBER [ID 7] |
| PROCESSOR ID NUMBER [ID 8] | TASK ID NUMBER [ID 8] |
| PROCESSOR ID NUMBER [ID 9] | TASK ID NUMBER [ID 9] |
| PROCESSOR ID NUMBER [ID A] | TASK ID NUMBER [ID A] |
| PROCESSOR ID NUMBER [ID B] | TASK ID NUMBER [ID B] |
| PROCESSOR ID NUMBER [ID C] | TASK ID NUMBER [ID C] |
| PROCESSOR ID NUMBER [ID D] | TASK ID NUMBER [ID D] |
| PROCESSOR ID NUMBER [ID E] | TASK ID NUMBER [ID E] |
| PROCESSOR ID NUMBER [ID F] | TASK ID NUMBER [ID F] |

*FIG. 2*

| OFFSET ADDRESS | MTRRs |
|---|---|
| 0 | P6_MTRRphysBase0 |
| 8 | P6_MTRRphysMask0 |
| 10 | P6_MTRRphysBase1 |
| 18 | P6_MTRRphysMask1 |
| 20 | P6_MTRRphysBase2 |
| 28 | P6_MTRRphysMask2 |
| 30 | P6_MTRRphysBase3 |
| 38 | P6_MTRRphysMask3 |
| 40 | P6_MTRRphysBase4 |
| 48 | P6_MTRRphysMask4 |
| 50 | P6_MTRRphysBase5 |
| 58 | P6_MTRRphysMask5 |
| 60 | P6_MTRRphysBase6 |
| 68 | P6_MTRRphysMask6 |
| 70 | P6_MTRRphysBase7 |
| 78 | P6_MTRRphysMask7 |
| 80 | P6_MTRRfix64K_00000 |
| 88 | P6_MTRRfix16K_80000 |
| 90 | P6_MTRRfix16K_A0000 |
| 98 | P6_MTRRfix4K_C0000 |
| 100 | P6_MTRRfix4K_C8000 |
| 108 | P6_MTRRfix4K_D0000 |
| 110 | P6_MTRRfix4K_E0000 |
| 118 | P6_MTRRfix4K_E8000 |
| 120 | P6_MTRRfix4K_F0000 |
| 128 | P6_MTRRfix4K_F8000 |

*FIG. 3*

| OFFSET ADDRESS | MSRs |
|---|---|
| 130 | P6_MISC_ENABLE |
| 138 | P6_MC0_CTL |
| 140 | P6_MC1_CTL |
| 148 | P6_MC2_CTL |
| 150 | P6_MC3_CTL |
| 158 | P6_MC0_STATUS |
| 160 | P6_MC1_STATUS |
| 168 | P6_MC2_STATUS |
| 170 | P6_MC3_STATUS |
| 178 | CR0 |

*FIG. 4*

METHOD FOR SYNCHRONIZING PROCESSORS IN SMI FOLLOWING A MEMORY HOT PLUG EVENT

TECHNICAL FIELD

The present disclosure relates generally to information handling systems and, more particularly, to a method for synchronizing processors in system management interrupt following a memory hot plug event.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including computer systems, typically include multiprocessor computer systems, wherein two or more processors may be coupled to a processor bus. During a start up or boot operation, one of the processors, commonly referred to as the boot processors, begins a power on self test and initializes the current setting of the computer system. One of these initializations includes a scan of the available memory present in the system.

The amount of available memory is typically stored in memory tables or registers. The other processors, generally referred to as the application processors, will read this table in order to determine where to cache. Following the boot up process, a static environment generally exist where the memory registers are known and synchronized by all processors.

During a memory hot plug event, the static environment has changed. Additional memory may not be recognized by the processors. And removed memory may cause a cache to an empty register and possibly crash the system.

One solution to this problem was to merely add the memory and use it in an "uncached" manner. However, the use of "uncached" memory suffers a performance loss. The loss may even be up to ninety percent of the installed memory. Thus, it is preferred for these ranges to be cached prior to use.

SUMMARY

Therefore, a need has arisen for a method for synchronizing processors during a system management interrupt caused from a memory hot plug event in a multiple processor system.

In accordance with one embodiment of the present disclosure, a method for synchronizing processors during an assertion of a system management interrupt (SMI) in an information handling system including, for each processor, identifying whether the processor is an interrupt handling processor assigned to perform processing tasks necessary for resolving the SMI or a non-interrupt handling processor not assigned to perform the processing tasks necessary for resolving the SMI. The method further includes creating a task structure operable to cause non-interrupt handling processors to perform at least one task for each interrupt handling processor. The method further includes automatically performing the at least one task during the SMI for each non-interrupt handling processor.

In a further embodiment, an information handling system includes a plurality of processors coupled to a processor bus and memory coupled to the processor bus. The plurality of processors including non-interrupt handling processors and an interrupt handling processor. The interrupt handling processor creates a task structure for the non-interrupt handling processors, wherein the non-interrupt handling processors perform a task based on the task structure.

In accordance with a further embodiment of the present disclosure, a computer-readable medium having computer-executable instructions for synchronizing processors in a SMI following a memory hot plug event in an information handling system including instructions for identifying whether the processor is an interrupt handling processor assigned to perform processing tasks necessary for resolving the SMI or a non-interrupt handling processor not assigned to perform the processing tasks necessary for resolving the SMI. The computer-readable medium further includes instructions for updating a memory table based on a change in memory caused by the memory hot plug event. The interrupt handling processor creates the updated memory table. The computer-readable medium further includes instructions for synchronizing the updated memory table with the non-interrupt handling processors.

One technical advantage of the present disclosure is the synchronization of the processors during the system management interrupt assertion. Because the processors tend to lose performance efficiency for using uncached memory, a task assigned to each processor for updating or synchronizing their memory registers prior to exiting the SMI assertion. The synchronization allows for each processor to recognize and utilize the available memory in the information handling system without re-booting.

Another technical advantage of the present disclosure is the ability to assign task to processors using a task structure. During a SMI assertion, each processor may be polled for another task. Typically, the processors are polled for completion of the SMI process and ready for simultaneous exit from the SMI handler. By using the task structure, processors may be assigned a variety of different task to perform prior to exiting the SMI handler.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
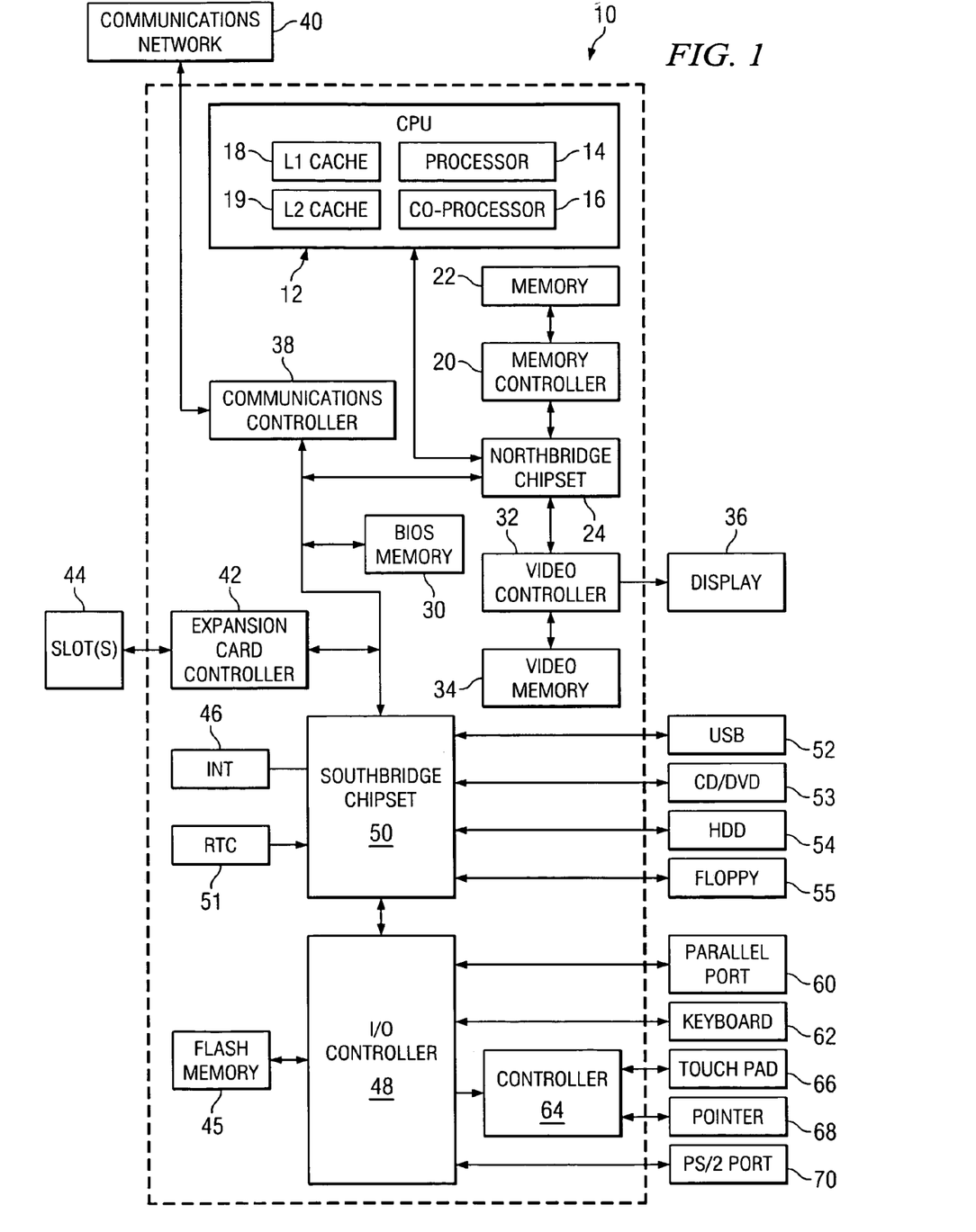
FIG. 1 is a block diagram showing an information handling system, according to teachings of the present disclosure.

Referring first to FIG. 1, a block diagram of information handling system 10 is shown, according to teachings of the present disclosure. Information handling system 10 or computer system preferably includes one or more microprocessors such as central processing unit (CPU) 12. CPU 12 may include processor 14 for handling integer operations and coprocessor 16 for handling floating point operations. CPU 12 is preferably coupled to cache, such as L1 cache 18 and L2 cache 19 and a chipset, commonly referred to as Northbridge chipset 24, via a frontside bus 23. Northbridge chipset 24 preferably couples CPU 12 to memory 22 via memory controller 20. Main memory 22 of dynamic random access memory (DRAM) modules may be divided into one or more areas such as system management mode (SMM) memory area (not expressly shown).

Graphics controller 32 is preferably coupled to Northbridge chipset 24 and to video memory 34. Video memory 34 is preferably operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Northbridge chipset 24 serves as a "bridge" between CPU bus 23 and the connected buses. Generally, when going from one bus to another bus, a bridge is needed to provide the translation or redirection to the correct bus. Typically, each bus uses its own set of protocols or rules to define the transfer of data or information along the bus, commonly referred to as the bus architecture. To prevent communication problem from arising between buses, chipsets such as Northbridge chipset 24 and Southbridge chipset 50, are able to translate and coordinate the exchange of information between the various buses and/or devices that communicate through their respective bridge.

Basic input/output system (BIOS) memory 30 is also preferably coupled to PCI bus 25 connecting to Southbridge chipset 50. FLASH memory or other reprogrammable, non-volatile memory may be used as BIOS memory 30. A BIOS program (not expressly shown) is typically stored in BIOS memory 30. The BIOS program preferably includes software which facilitates interaction with and between information handling system 10 devices such as a keyboard 62, a mouse such as touch pad 66 or pointer 68, or one or more I/O devices. BIOS memory 30 may also store system code (note expressly shown) operable to control a plurality of basic information handling system 10 operations.

Communication controller 38 is preferably provided and enables information handling system 10 to communicate with communication network 40, e.g., an Ethernet network. Communication network 40 may include a local area network (LAN), wide area network (WAN), Internet, Intranet, wireless broadband or the like. Communication controller 38 may be employed to form a network interface for communicating with other information handling systems (not expressly shown) coupled to communication network 40.

In certain information handling system embodiments, expansion card controller 42 may also be included and is preferably coupled to PCI bus 25 as shown. Expansion card controller 42 is preferably coupled to a plurality of information handling system expansion slots 44. Expansion slots 44 may be configured to receive one or more computer components such as an expansion card (e.g., modems, fax cards, communications cards, and other input/output (I/O) devices).

Southbridge chipset 50, also called bus interface controller or expansion bus controller preferably couples PCI bus 25 to an expansion bus. In one embodiment, expansion bus may be configured as an Industry Standard Architecture ("ISA") bus. Other buses, for example, a Peripheral Component Interconnect ("PCI") bus, may also be used.

Interrupt request generator 46 is also preferably coupled to Southbridge chipset 40. Interrupt request generator 46 is preferably operable to issue an interrupt service request over a predetermined interrupt request line in response to receipt of a request to issue interrupt instruction from CPU 12. Southbridge chipset 40 preferably interfaces to one or more universal serial bus (USB) ports 52, CD-ROM (compact disk-read only memory) or digital versatile disk (DVD) drive 53, an integrated drive electronics (IDE) hard drive device (HDD) 54 and/or a floppy disk drive (FDD) 55. In one example embodiment, Southbridge chipset 40 interfaces with HDD 54 via an IDE bus (not expressly shown). Other disk drive devices (not expressly shown) which may be interfaced to Southbridge chipset 40 include a removable hard drive, a zip drive, a CD-RW (compact disk-read/write) drive, and a CD-DVD (compact disk—digital versatile disk) drive.

Real-time clock (RTC) 51 may also be coupled to Southbridge chipset 50. Inclusion of RTC 74 permits timed events or alarms to be activated in the information handling system 10. Real-time clock 74 may be programmed to generate an alarm signal at a predetermined time as well as to perform other operations.

I/O controller 48, often referred to as a super I/O controller, is also preferably coupled to Southbridge chipset 50. I/O controller 48 preferably interfaces to one or more parallel port 60, keyboard 62, device controller 64 operable to drive and interface with touch pad 66 and/or pointer 68, and PS/2 Port 70. FLASH memory or other nonvolatile memory may be used with I/O controller 48.

Generally, chipsets 24 and 50 may further include decode registers to coordinate the transfer of information between CPU 12 and a respective data bus and/or device. Because the number of decode registers available to chipset 24 or 50 may be limited, chipset 24 and/or 50 may increase the number or I/O decode ranges using system management interrupts (SMI) traps.

Typically, during start-up of information handling system 10, a BIOS initialization or power on self test (POST) operates or runs on system 10 in the form of a pre-operating system (pre-OS) environment. At which time, a memory map or table (shown below in more detail) may be created to indicate the location of cacheable memory that is physically installed in system 10. Generally, when a memory hot plug event has taken place in a typical multiple processor system, the system may generate a system management interrupt (SMI). The SMI occurs to allow the processors to update their respective memory tables. Thus, each of the processors will enter SMI and wait for a task directing them to update their respective memory table.

Figure 2:
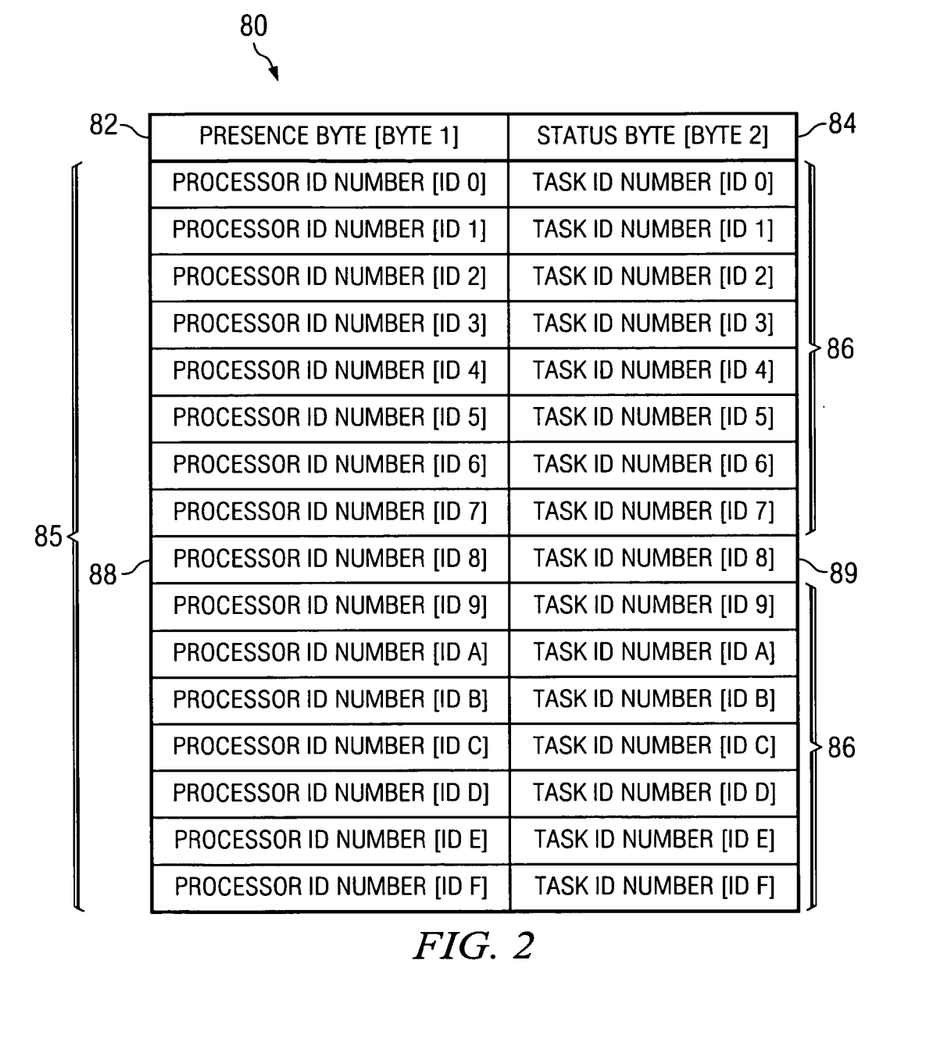
FIG. 2 illustrates an example embodiment of a memory table with a task structure in the information handling system, according to teachings of the present disclosure.

FIG. 2 illustrates an example embodiment of memory table 80 with task structure 84. Memory table 80 may be formatted into a table such that each processor or CPU is represented by presence bit 82, generally referred to as "Byte 1." Typically, presence bit 82 is a unique identification for each processor such that the boot processor ("BP"), or interrupt handling processor, may be identified from the non-interrupt handling processors or application processors ("AP"). In general, presence bit 82 includes the identification value of an advanced programmable interface controller (APIC) ID that is unique to each processor.

Within memory table 80, each processor may be associated with task bit 86 forming a part of task structure 84, also referred to as "Byte 2." Task bit 86 may be used to indicate or direct the associated processor with a particular task or function to form task structure 84 for the processors in memory table 80.

For example, an application processor may be identified using identification presence bit 88 having assigned task 89. In some embodiments, presence bit 88 and assigned task 89 are maintained using a hexadecimal numbering scheme. Assigned task 89 may include task for processor to update its respective model-specific registers (MSRs) and memory type range registers (MTRRs). However, assigned task 89 may include any operation generally assigned to a processor in a SMI operation.

Figure 3:
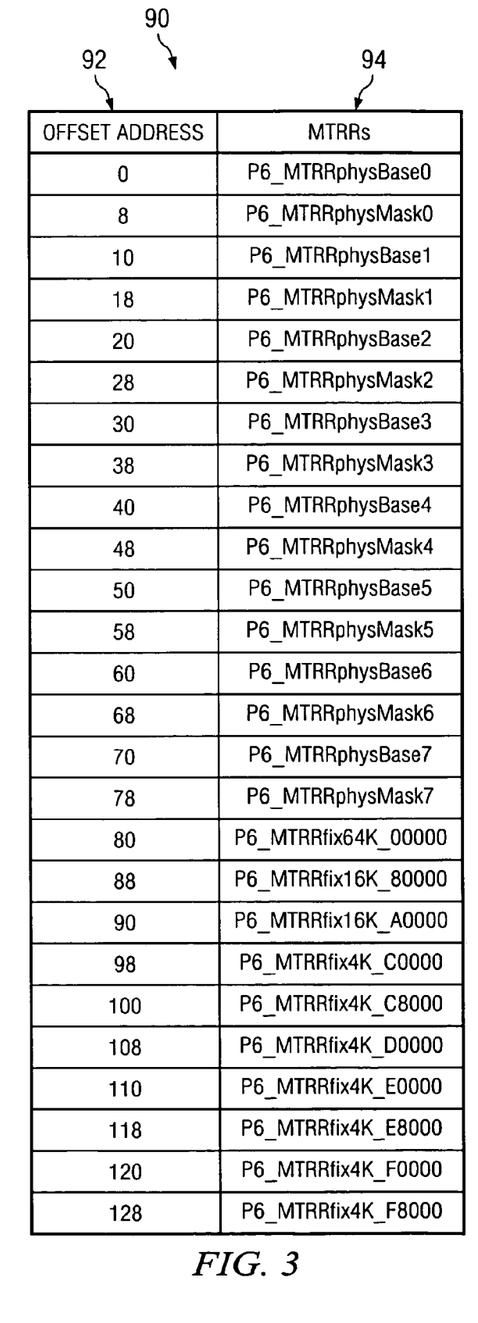
FIG. 3 illustrates an embodiment of a memory type range register (MTRR) table in the information handling system, according to teachings of the present disclosure.
Figure 4:
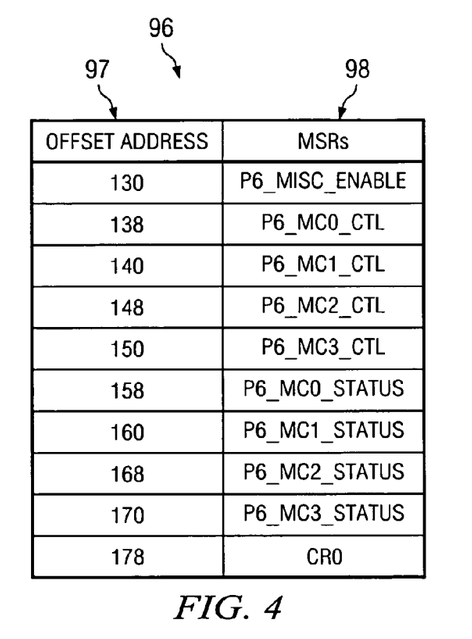
FIG. 4 illustrate an example embodiment of an model-specific register (MSR) table in the information handling system, according to teachings of the present disclosure.

FIGS. 3 and 4 illustrate example embodiments of memory type range register (MTRR) table 90 and model-specific register (MSR) table 96 of information handling system 10. Typically, during a POST operation, information handling system 10 creates and maintains MSR table 96 and MTRR table 90. MTRR table 90 generally includes a table of memory registers for use in controlling process access to certain memory ranges within information handling system 10. MSR table 96 generally includes a table of memory registers available for use within information handling system 10.

MTRR table 90 includes offset address 92 for locating the registers stored in memory. Each offset address 92 may use a hexadecimal numbering system to locate information or MTRR values 94 placed in each register. Similarly, MSR table 96 may use offset address 97 for locating registers that store MSR values 98 in the register. Because the information stored in the registers may be modified, MTRR values 94 and MSR value 98 generally include read/write type of registers that are updated during a memory hot plug event.

Generally, a memory hot plug event includes the addition and/or removal of memory from information handling system 10. Upon the occurrence of the event, a system management interrupt (SMI) may be generated to initiate the processors to enter a SMI handler. In other embodiments, the processors may enter a SMI handler for handing a separate task but may be synchronized for the memory hot plug event during the SMI event.

Figure 5:
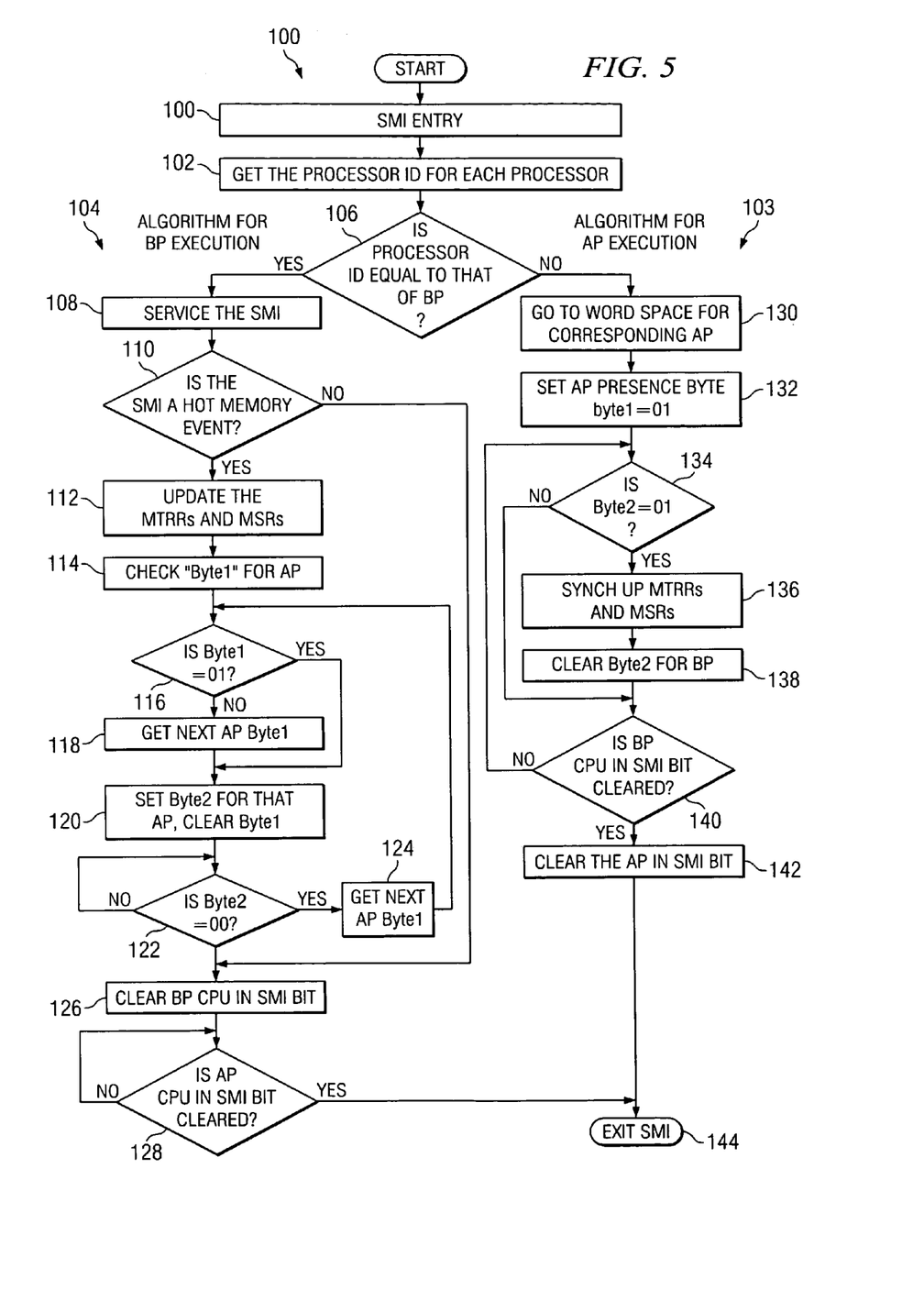
FIG. 5 is a flowchart for a method of synchronizing processors in a SMI during a memory hot plug event, according to teachings of the present disclosure.

FIG. 5 is a flowchart for a method of synchronizing processors in a SMI during a memory hot plug event. In some embodiments, the method is stored on a computer-readable medium having computer-executable instructions for performing the method. Following a memory hot plug event, a SMI has been initiated such that the processors enter a SMI handler, as shown at block 100. At block 102, each processor may be identified according to a processor identification number such as a APIC ID. The APIC ID may be used to determine whether the processor is a non-interrupt handling processor such as an application processor (AP) or an interrupt handling process such as the boot processor (BP) as shown at block 106.

If the processor ID is equal to that of the boot processor, the method may continue to service the SMI at block 108. Following the servicing of the SMI, a determination is made to determine whether the SMI was caused by a memory hot plug event, as shown at block 110. If this was not a SMI caused by the memory hot plug event, the SMI handler indicates that the boot processor is ready to exit the SMI handler. In one embodiment, the SMI handler clears the "BP CPU in SMI bit" such that the SMI handler can indicate to the other processors that it is ready to exit.

However, if the SMI was caused by a memory hot plug event, the boot processor may update the memory tables such as MTRR table 90 and MSR table 96, as shown at block 112. Once the memory tables are updated, the boot processor may assign a task to the other processors using memory table 80. Typically, boot processor may modify the value of task structure 84 such that the associated processor updates or synchronizes its memory tables with the revised or updated memory tables based on the memory hot plug event.

In the meantime, the non-interrupt handling processors such as the application processors are sorted to a different pathway from the determination at block 106. Concurrently with the boot processor handling the SMI, the application processors modify their status or presence in memory table 80, as shown in block 130. For example, in some embodiments, the application processors may set their respective presence bit 82 or Byte 1 to a value of "01" as shown in block 132. In this instance, the value of "01" may be used to indicate that that application processor is present within information handling system 10 and is to be updated following the update of the memory tables.

At this point, the application processors determine whether their respective task bit 86, namely Byte 2, has been set to indicate that the application processor should proceed to update their memory tables, generally referred to as synchronizing the processors. In some instances, task bit 86 may be set to a value of "01" to indicate the memory tables were updated via the boot processor and the application processor may update its own memory registers, as shown in block 134.

Concurrently, the boot processor begins the updating process by checking the value of presence bit 82, also known as "Byte 1" for each of the processors, as shown at block 114. A determination is made for each processor whether the value of presence bit 82 is set to indicate that the processor is present within information handling system 10 and thus the processor is to be updated or synchronized before exiting the SMI as shown at block 116. If presence bit 84 for the selected processor does not indicate that the processor is present, the method continues to another processor for determining whether the processor is present as shown at block 118.

In one instance, if the value of Byte 1 is determined to be "01," the processor is determined to be present within information handling system 10 and needs to be set for updating such that "Byte 2" or task bit 86 for the associated processor is set for updating as shown at block 120. In some instances, setting task bit 86 for a particular processor includes clearing the indication of presence bit 84 such that "Byte 1" no longer is the value of "01."

Back at block 134, the method is determining whether the application processors are set for updating the memory registers. Once the boot processor has set task bit 86 for a particular processor to an indication value for updating such as the value of "01," the application processor proceeds to update or synchronize it respective memory tables such as MTRR table 90 and MSR table 96, as shown at block 136. Typically, during the synchronization process, the non-interrupt handling processors snoop each of the other non-interrupt handling processors cache such that all non-interrupt handling processor recognize memory addresses as cacheable memory or non-cacheable memory.

Once synchronized, the method clears task bit 86 for the boot processor to indicate the updating or synchronization process for that particular application is complete as shown at block 138. In one instance, the clearing of task bit 86 includes setting the value of to "00." At block 122, the method determines whether task bit 86 for the boot processor is clear or set to a value of "00" as shown at block 122. The method continues to check while waiting for the application processor to complete the synchronization process.

After the application processor is synchronized, the method determines whether to continue to the next application processor as shown in block 123. If there are no other application processors to synchronize, the method clears the "BP CPU in SMI bit" such that the SMI handler can indicate to the other processors that it is ready to exit as shown in block 126. Otherwise, the method continues to get the value of "Byte 1" or presence bit 84 from another application processor, as shown in block 124, such that a determination is made whether the present bit 84 indicates that the processor is present in block 116. The method continues until the application processors have been synchronized.

At block 140, the method determines whether the boot processor is ready for exit such that the "BP CPU in SMI bit" is cleared. If the boot processor is not ready for exit, the method continues to loop for each processor to determine whether task bit 86 is equal to a value that indicates it is ready for synchronization at shown in block 134. However, if the boot processor is ready for exit at block 140, the SMI handler indicates that the application processors are ready for exit at block 142. In one embodiment, the SMI handler clears the "AP CPU in SMI bit" such that the SMI handler can indicate that the application processors are ready to exit.

Since the boot processor had already indicated that it was ready to exit at block 126, the method determines whether the application processors are ready to exit at block 128. Once the boot processor receives the indication that the application processors are ready to exit, the method exits the SMI handler at block 144.

Although the disclosed embodiments have been described in detail, it should be understood that various changes, substitutions and alterations can be made to the embodiments without departing from their spirit and scope.

What is claimed is:

1. A method for synchronizing processors during an assertion of a system management interrupt (SMI) in an information handling system, comprising:
    for each processor, identifying whether the processor is an interrupt handling processor assigned to perform processing tasks necessary for resolving the SMI or a non-interrupt handling processor not assigned to perform the processing tasks necessary for resolving the SMI;
    an interrupt handling processor creating a task structure operable to cause a non-interrupt handling processor to perform at least one task;
    the non-interrupt handling processor automatically peforming the at least one task during the SMI; and
    updating a memory register for the interrupt handling processor during the SMI such that a memory table is updated.

2. The method of claim 1, wherein the at least one task comprises synchronizing the memory registers with the non-interrupt handling processors based on the updated memory table.

3. The method of claim 1, said non-interrupt handling processor snooping a cache in another non-interrupt handling processor.

4. The method of claim 1, wherein the at least one task comprises exiting the SMI handler.

5. The method of claim 1, further comprising entering an SMI handler based on a memory hot plug event.

6. The method of claim 5, wherein the memory hot plug event comprises adding memory to the information handling system.

7. The method of claim 5, wherein the memory hot plug event comprises removing memory to the information handling system.

8. An information handling system, comprising:
    a plurality of processors coupled to a processor bus;
    a memory coupled to the processor bus;
    the plurality of processors including non-interrupt handling processors and an interrupt handling processor; and
    wherein the interrupt handling processor is operable to create a task structure for the non-interrupt handling processors, wherein the non-interrupt handling processors perform a task based on the task structure; and
    wherein the task structure comprises a presence bit operable to indicate the presence of each of the plurality of processors.

9. The information handling system of claim 8, wherein the task structure further comprises a task bit operable to indicate the task to perform by the non-interrupt handling processor.

10. The information handling system of claim 8, further comprising a memory table.

11. The information handling system of claim 10, wherein the memory table comprises a memory type range register (MTRR) table.

12. The information handling system of claim 10, wherein the memory table comprises a model-specific register (MSR) table.

13. A computer-readable medium having computer-executable instructions for synchronizing processors in a system management interrupt (SMI) following a memory hot plug event in an information handling system, comprising:
    instructions for identifying whether each of a plurality of processors is an interrupt handling processor assigned to perform processing tasks necessary for resolving the SMI or a non-interrupt handling processor not assigned to perform the processing tasks necessary for resolving the SMI;
    instructions for updating a memory table based on a change in memory caused by the memory hot plug event, an identified interrupt handling processor operable to update the memory table; and
    instructions for synchronizing the updated memory table with multiple identified non-interrupt handling processors.

14. The computer-readable medium of claim 13, further comprising instructions for creating a task structure operable to cause non-interrupt handling processors to perform at least one task.

15. The computer-readable medium of claim 14, wherein instructions for creating the task structure further comprise instructions for modifying a task bit corresponding to a specific task for each of the processors.

16. The computer-readable medium of claim 13, wherein the instructions for updating the memory table comprise instructions for updating registers to the memory table.

17. The computer-readable medium of claim 13, further comprising instructions for snooping cache in each of the non-interrupt handling processors such that all non-interrupt handling processors recognize memory addresses as cacheable memory or non-cacheable memory.

18. The computer-readable medium of claim 13, further comprising instructions for entering an SMI handler based on the occurrence of the memory hot plug event.

* * * * *